US012138664B2

(12) United States Patent
Kaminski et al.

(10) Patent No.: US 12,138,664 B2
(45) Date of Patent: Nov. 12, 2024

(54) INSPECTION AND SORTING APPARATUS

(71) Applicant: Mettler-Toledo Safeline X-Ray Ltd., Royston (GB)

(72) Inventors: Kamil Kaminski, Papworth Everard (GB); Gareth Jones, Papworth Everard (GB); Adam Dorrington, Luton (GB); Danilo De Rossi, Cambridge (GB)

(73) Assignee: Mettler-Toledo Safeline X-Ray Ltd., Royston (GB)

( * ) Notice: Subject to any disclaimer, the term of this patent is extended or adjusted under 35 U.S.C. 154(b) by 0 days.

(21) Appl. No.: 18/390,984

(22) Filed: Dec. 20, 2023

(65) Prior Publication Data

US 2024/0253082 A1 Aug. 1, 2024

(30) Foreign Application Priority Data

Jan. 30, 2023 (EP) .................................... 23153953

(51) Int. Cl.
*B07C 5/38* (2006.01)
*B07C 5/342* (2006.01)

(52) U.S. Cl.
CPC .............. *B07C 5/38* (2013.01); *B07C 5/3427* (2013.01)

(58) Field of Classification Search
CPC .. B07C 5/36; B07C 5/38; B07C 5/363; B07C 5/365; B07C 5/3416; B07C 5/3427; B65G 21/08; B65G 21/10
USPC .......................................................... 209/509
See application file for complete search history.

(56) References Cited

U.S. PATENT DOCUMENTS

| | | | | |
|---|---|---|---|---|
| 9,696,326 | B2 | 7/2017 | Parmee | |
| 10,451,567 | B2 | 10/2019 | Kaminski et al. | |
| 11,278,938 | B2 | 3/2022 | Matsushima et al. | |
| 2002/0060174 | A1 | 5/2002 | Nakajima | |
| 2006/0237349 | A1* | 10/2006 | Solomon | G11B 17/08 |
| 2017/0225200 | A1* | 8/2017 | Makino | G01N 23/04 |
| 2019/0232339 | A1* | 8/2019 | Kania | B07C 5/16 |
| 2023/0093613 | A1* | 3/2023 | Neale | G01N 33/02 198/369.2 |

* cited by examiner

*Primary Examiner* — Michael McCullough
*Assistant Examiner* — Jessica L Burkman
(74) *Attorney, Agent, or Firm* — Standley Law Group LLP; Jeffrey S. Standley; Adam J. Smith

(57) ABSTRACT

An inspection and sorting apparatus includes a support frame supporting a transport mechanism with an endless transport belt extending along an inspection zone with an inspection mechanism for transported items and a sorting zone with a sorting mechanism for moving rejected items transverse to a transport path to a sorting side. When in an operation state, a space lateral to and alongside the sorting zone is covered by a housing cover but is open to the sorting zone and to a downside to allow rejected items to further fall or slide down by gravity. Alternatively, or additionally, the apparatus includes a side cover covering a region below the sorting zone laterally from the sorting side. The housing cover and/or the side cover is movable between a covering position in the operation state of the apparatus and a release position granting lateral access to the sorting zone and/or to said region from the sorting side.

18 Claims, 5 Drawing Sheets

INSPECTION AND SORTING APPARATUS

CROSS-REFERENCE TO RELATED APPLICATIONS

This application claims the benefit of European Patent Application EP 23153953.7 filed Jan. 30, 2023, the disclosures of which are hereby incorporated by reference as if fully restated herein.

TECHNICAL FIELD

Exemplary embodiments relate generally to inspection and sorting apparatuses.

BACKGROUND AND SUMMARY OF THE INVENTION

The invention is related to inspection and sorting apparatus, in particular to inspection and sorting apparatus comprising a support frame supporting a transport mechanism with an endless transport belt extending along an inspection zone in which items transported on the transport belt along a transport path are inspected by an inspection mechanism and along a sorting zone in which items to be rejected are sorted out by being moved, by a sorting mechanism, out of the transport path in a direction transverse to the transport path to a sorting side, wherein, in an operation state of the apparatus, a space lateral to and alongside the sorting zone, into which the rejected items are moved, is covered by a housing cover but is open to the sorting zone and to the downside to allow the rejected items to further fall or slide down by gravity and/or the apparatus is provided with a side cover covering a region below the sorting zone laterally from the sorting side.

Inspection and sorting is among other a task arising in, e.g., inspection of food products or pharmaceutical products in terms of checking them whether they are in compliance with given conditions, to avoid foreign material or other, as well-known by the person skilled in the art.

When radiation scanner systems such as X-ray systems are used for inspection, there is additionally the need to cover the apparatus appropriately, such that the cover provides shielding against X-ray radiation, including stray radiation. This task is in conflict with sorting mechanisms which deflect rejected items out of the standard transport path of the items and continued for not-rejected items. Namely, for leaving the transport path, respectively transport belt, there needs to be an opening in the shielding cover, and the space behind such opening needs also to be protected, that is along at least part of the rejection path the rejected items take on their way to, e.g., a rejection bin collecting rejected items.

For this reason, X-ray inspection and sorting systems are often implemented as modular units, with a separated isolated X-ray inspection system module which itself, has no sorting mechanism and can be inserted into a processing line in which a sorting unit is provided further downstream. There are, however, also non-modular systems, in which inspection and sorting is done within one device, having its endless transport belt extending along both inspection zone and sorting zone. Such a system is, e.g., disclosed in document WO 2009/112852 A1, where a continuous belt passes an inspection point and a reject point, and a bin is arranged sidewise at the level of the reject point to accommodate rejected items. This document is further related to a test sample adapted to challenge the measuring and/or monitoring equipment of such device, in form of a laminated card with foreign body test pieces and ID-zones.

In EP 3 486 640 A1, a radiation scanner system and sorting system is disclosed, where a separation gap is provided between a reject bin top and a reject bin bottom. The separation gap allows to pass the transport section of the conveyor belt therethrough while the slack return section of the conveyor belt loop is passed around the reject bin bottom. Thereby, EP 3 486 640 A1 solves the problem to take the conveyor belt out of the enclosure cabinet of the radiation scanner system by removing or opening only one enclosure door, which, in the operation/working position of the apparatus, extends in transport direction over the entire remaining width (apart from the sorting zone where the reject bin is arranged) of the frontside of the enclosure cabinet of the radiation scanner system.

US 2002/0060174 A1 discloses a specific nozzle arrangement with covers for regulating a flow of air to be blown from a nozzle to an article such that the article can be reliably sorted out by said air blow. Here, a sorting cover for discharged articles is arranged in an oblique manner.

The invention seeks to improve an inspection and sorting apparatus as initially introduced, that is where inspection and sorting takes place along one and the same endless transport belt, such as disclosed in WO 2009/112852 A1, aiming at a combination of reliably, safe use and easy handling of the apparatus when not in use.

To this end, the invention provides a further development of an inspection and sorting apparatus of the kind as initially introduced, which is essentially characterized in that the housing cover and/or the side cover is movable between its/their covering position in the operation/working state of the apparatus and a release position granting lateral access to the sorting zone and/or to said region from the sorting side.

In said release position, where the moved housing cover/side cover is still connected to the apparatus, such that dismounting and re-mounting is not required, better access is given to allow, e.g., cleaning of the interior of the apparatus and, when the side cover is moved, even a better accessibility for belt removal, while the handling of the apparatus when not used is still comfortable even if more operation/handling steps are needed in terms of additional required moving of parts. On the other hand side, since housing cover and/or side cover, in the operation/working state of the apparatus, are in their covering position, sufficient coverage/shielding is provided also in the region of the sorting zone. Hereto, as seen in height direction, shielding at the sorting side at level of the sorting zone reaches downwards preferably up to and even beyond the height level of the return path of the transport belt.

Specifically, the entire transport belt is, after access being provided by having the housing cover/side cover in their release position, removable along a removal path on a height level above the housing cover in its release position.

In a preferred embodiment, it is provided that the housing cover and the side cover are connected and their motion between covering and release position is linked. Thereby, access to sorting zone and below for belt removal access in the part related to the sorting zone is provided by one motion/operation for the operator only.

In a further preferred embodiment, it is provided that the motion between covering position and release position is uniform as seen along the direction of the transport path. Moreover, it is preferred that the motion between covering and release position is a pivot motion.

To this end, it is also provided that a close/release means is provided to block/allow the pivot motion from the covering position into the release position. Said opening/release means firmly secure the respective cover in its/their covering position when the apparatus is operated.

In a further preferred embodiment, it is provided that the pivot axis of the pivot motion has a predominant component of direction along the transport path.

In an even more preferred embodiment, the pivot axis is in a horizontal plane and preferably arranged in transport direction. Thereby, free space below the sorting zone can be exploited, and it is in particular provided that the housing cover/side cover does, during the pivot motion, not extend beyond its furthermost end part in its covering position, seen in transport direction. This allows full integrability of the apparatus into a processing line, without any additional exit zone length of the transport path. As already addressed, it is preferably provided that, in the release position of the side cover, a strap formed by the transport path of and return path below the sorting zone is accessible. That is, not only access to the sorting zone above the transport belt maybe granted, but also the access for easier transport belt removal/exchange.

In a further preferred embodiment, it is provided that the inspection zone, a further region below the inspection zone, an inlet zone along which the transport belt is extended upstream the transport path of the inspection zone, and/or an again further region below the inlet zone is laterally covered by a further side cover arrangement in its covering position in the working state, and is movable, in particular pivotable, in particular about a pivot axis parallel to or colinear with the pivot axis of the housing cover and/or the side cover, as a whole or in two or more pieces.

Generally, it could be that said further side cover is connected to the housing, and the side cover such that also their motion could be linked, however, a separation into more side cover pieces independently movable is preferred. In this way, it is even possible to have different opening angles among the pivoted covers, e.g., the cover for the inspection zone can have a first opening angle, preferably to end up in a horizontal surface. Said horizontal surface could even be used for the operator as a desk when in its release position. Moreover, the covering panels on the side of the inlet zone and the sorting zone can provide for opening angles beyond 90°, in particular beyond 120°, further preferred beyond 145°. Thereby, operation personal can approach the transport belt at the inlet zone and the sorting zone even closer. In this regard, it is also preferred that, as seen in transport direction, there is no overlap between the lower portion of the support frame on a height level of the transport belt return path on the one hand side and the housing cover/further side cover in their opening position.

Preferably, at the beginning and the end of the transport path and/or between inlet zone and inspection zone as well as between inspection zone and sorting zone, a shielding curtain is provided, such shielding curtain could be configured as vertically switch sheets of, e.g., rubber or of a rubber-like material containing a radiation/blocking component such as lead oxide or tungsten, for example as a sandwiched laminate or in distributed form. An entire shielding curtain can consist of a single sheet, but also more sheets such as a carpet pair of sheets can be used with the slits of one sheet offset against the slits of the other, so as to minimize the radiation leakage through the curtain.

In a further preferred embodiment, a bin is provided, the bin being positionable below said space in working position, for accommodating rejected items falling down/through said space.

Several bin configurations are thought of to accommodate the rejected items, beginning from a simple bin placed below the (opening) bottom of the housing cover. The bin may have roller to be rolled for transport. The bin may be positioned in a hanging arrangement within the housing cover. In one such embodiment, it is also thought that the bin is releasably mounted to the side cover and/or housing cover and the motion of the housing is in particular effectable in the mounting position of the bin.

Then, for quick access to the sorting zone or the region below where the transport belt is running, the cover housing can be just pivoted with the bin still in its mounted place. In this regard, at least a part of the front cover of the housing cover can be opened such as to release the bin for motion, e.g., sliding motion out of the position in/beyond the housing cover. In its closed position, movability of the bin is blocked by said at least openable portion of the front cover.

In a further preferred embodiment, it is provided to have an inner cover laterally covering a space between transport path side and return path side of the transport belt and dimensioned to pass through the interior of the endless belt when the endless belt is relatively moved with respect to the inner cover transverse to the transport direction. By said inner cover, a protection versus the interior of the apparatus in the region of the interior of the loop of the transport belt is still provided, even if all movable cover housing/cover panels are in their release position, while said inner cover does not block the removal path for the lateral removal/exchange of the transport belt.

In a further preferred embodiment, the apparatus is comprising a support/carrier beam, extending in particular in transport path direction, to which a hinge mechanism for the pivoting motion of the housing cover, the side cover, and/or the further cover are mounted, said carrier being in particular arranged on a height level below the inner cover and below the return path of the transport belt.

Said support beam can, in particular being made of one piece, which is preferred. Regarding height-positioning, it is preferred that a/the hinge mechanism position for said pivoting motion of housing cover, side cover, and/or further side cover is a vertical distance from the height level of the return path of the transport belt of more than 1 cm, preferably more than 2 cm, in particular more than 3 cm, and/or lower than 16 cm, preferably lower than 12 cm, in particular lower than 8 cm. This gives a preferred dimensional interplay regarding positioning of the cover panels/cover housing in their release position, space for lateral removal of the transport belt and overall dimension of side cover panels/housing cover.

The transport belt is driven in known manner by a drive mechanism including a drive motor. For instance, such drive motor can be arranged adjacent and below of a driven end roller at the sorting-side end of the transport path. Moreover, preferably it is provided that a holding mechanism holding a roller at the beginning and/or a roller at the end of the transport path of the transport belt is switchable from a holding position for the working state of the apparatus and a release position allowing the belt to be stripped off for lateral removal.

For instance, one of said roller can be moved from its position in the working/operating state of the apparatus into a tension release position such that the transport belt can be removed with reduced/even without tension of the belt. In particular, two holding arms are arranged pivotable about an axis orthogonal to transport direction and to gravity, said arms holding the roller at their free end.

The apparatus may have several safety means, e.g., an electrical interlock between the X-ray generator of the inspection mechanism and those movable cover elements (panels, housing), whereby power to the X-ray generator is automatically cut off when one of these movable covering elements is not in their covering position of the working/operating state of the apparatus.

In a preferred embodiment, the apparatus comprises an operating panel, said operating panel being preferably to the side of the sorting side. Such operator panel can be provided with several operating functions, including also an input means, e.g., in form of a touchscreen, even multitouch-screen, and/or an emergency stop button. The operator's side preferably coincides with the sorting side, that is sorting is to the lateral side where the operation panel is arranged. This gives more versatility for the inserting of the apparatus into a processing line.

The advantages provided by the arrangement of the housing cover/bin is preferably for an inspection mechanism requiring highest level of shielding, such as radiation scanner systems, in particular X-ray scanner. However, it is also beneficial for other kind of inspection, such as optical inspection, and even weight inspection by having a weighing unit at weighing zone as inspection zone. The preferred inspection mechanism, however, consists of or comprises radiation scanning technique, in particular X-ray inspection technique. For inspection techniques not requiring shielding, a frame part can be used instead of the shielding housing cover and/or side cover.

From the above, it is also recognizable that the arrangement of the housing cover/bin for granting better access is also independent of the particular technique of the sorting mechanism, any kind of sorting mechanism used in the art can be used here, including pushing by mechanical pushing or air blast, bifurcation elements pivoted/moved into the transport path to deflect a rejected item, or other. Moreover, it is provided that, as used in the art, a control of the apparatus equipped with evaluation software giving, in real time immediate result of inspection so as to generate a signal indicative of whether an item is to be rejected, said signal being received timely by a actuator of the sorting mechanism to provide for a rejection action at the time the rejected item passes the appropriate rejection point in the sorting zone, as generally known in the art.

BRIEF DESCRIPTION OF THE DRAWINGS

Further features, details and advantages of the invention are described in the subsequent specification with reference to the accompanying figures, wherein.

DETAILED DESCRIPTION OF EXEMPLARY EMBODIMENT(S)

Figure 1:
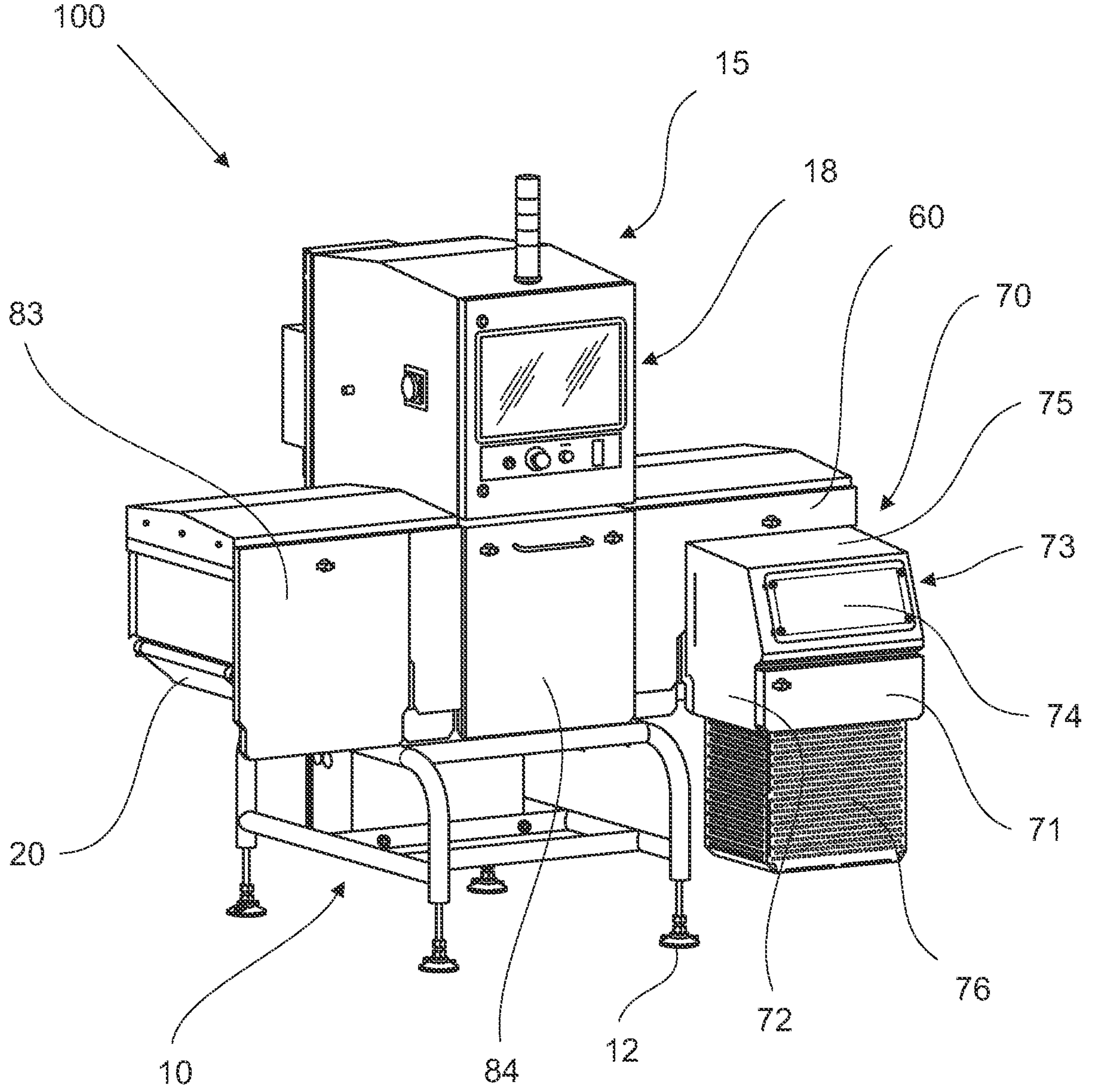
FIG. 1 shows an inspection and sorting apparatus in a perspective view from the front side in a working state.

An inspection and sorting apparatus 100 as shown in FIG. 1 comprises a support frame 10 standing on height-adjustable feet 12. Supported by support frame 10 is a transport mechanism comprising an endless conveyor belt 20. The upper side of conveyor belt 20 defines a transport plane and a transport path, along which items to be inspected and sorted (not shown) are transported, in FIG. 1 from the left to the right. Roughly centered with reference to the extension of the transport belt 20 is an inspection unit 15. In this embodiment, inspection unit 15 is an X-ray inspection unit, as such known to the person skilled in the art and, therefore, not further described here regarding inspection aspects.

Figure 2:
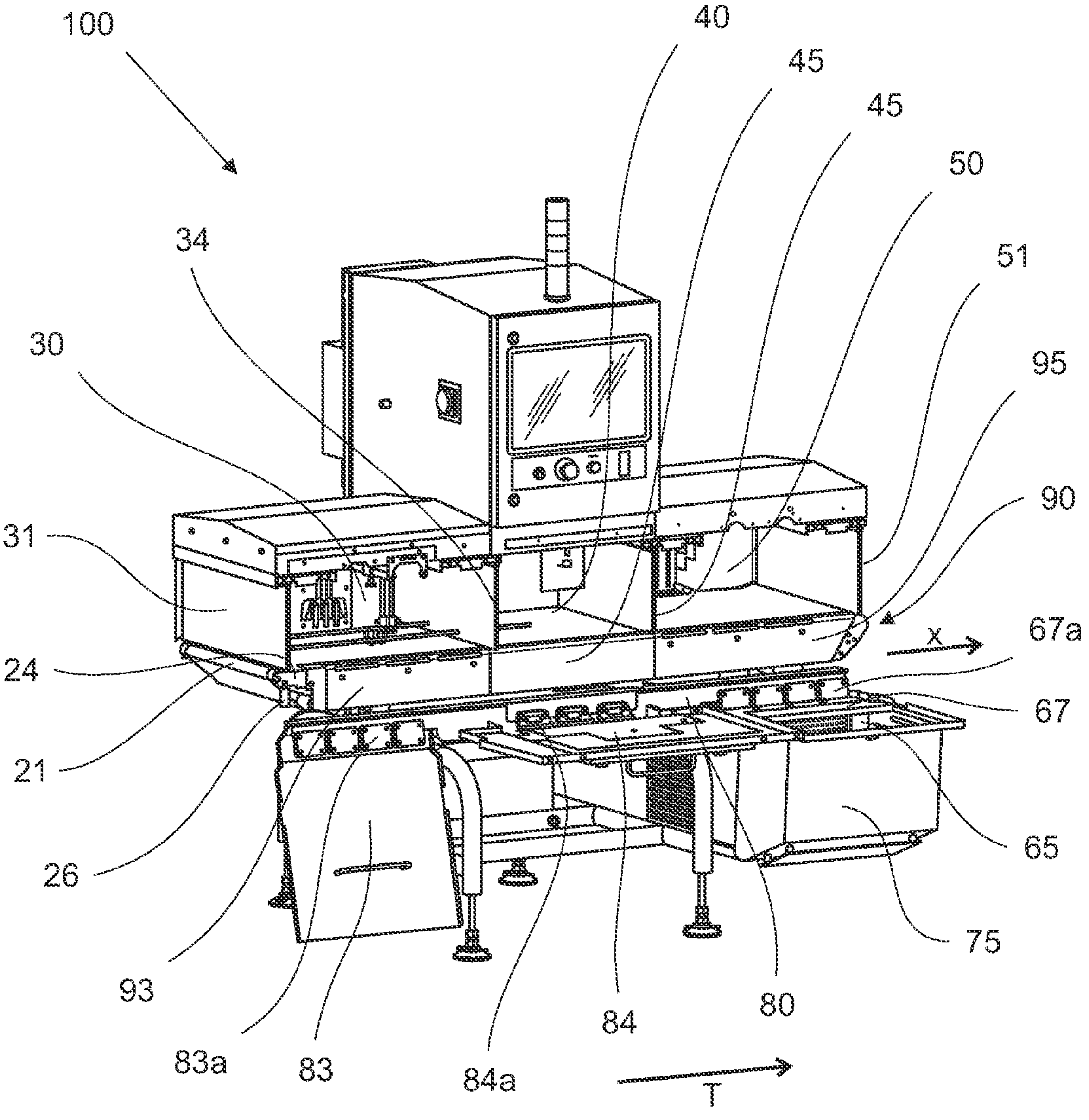
FIG. 2 shows the apparatus of FIG. 1 in a non-working state.

Items to be inspected and sorted enter the apparatus 100 by passing a first (shielding) curtain 31 (FIG. 2) to enter an inlet zone 30 as starting section of the transport path, covered to the front side by a first cover panel 83. Further downstream in transport direction the items pass a second curtain 34 to enter an inspection zone 40 (FIG. 2) which is covered by second cover panel 84, where the items are X-ray inspected by inspection unit 15. After inspection, the items pass a third curtain 45 to reach a sorting zone 50 (FIG. 2). Those items successfully passing the X-ray inspection are then leaving the apparatus 100 by passing a fourth curtain 51, to be then handed over to subsequent processing, e.g., to another transport belt.

Those items not successfully passing the X-ray inspection (in the following: rejected items) are sorted out by a not-shown sorting mechanism, which in the shown embodiment is implemented by air-blasting. As generally known in the art, the function of the sorting mechanism is to deflect the rejected items out of the transport path, such that they do not leave the sorting zone 50 in transport direction, but are deflected to a sorting side, in FIG. 1, 2 to the front side (respectively right side when viewed in transport direction). The rejected items are thus moved through an opening 65 in a third panel 60 laterally covering (with exception of opening 65) the sorting zone 50. Thereby, the rejected items enter the space beside the sorting zone 50, which is covered by housing cover 70. As can be seen by FIG. 1, housing cover 70 has a top cover 75, lateral covers 72 and 73, and towards the sorting side a front cover with a first upper portion 74 and a lower second portion 71, which is hinged to be pivotable such that a bin 76, which in this embodiment is configured as hanging in housing cover 70, can be removed to be emptied and re-inserted.

As one can see from FIG. 1, an operation panel 18 of inspection unit 15 is facing also to the sorting side, that is the apparatus 100 has a front side being the operating side and the sorting of rejected items being also versus the operating side (which is the sorting side).

Further, as one can see from FIG. 1, in the working state/configuration, the apparatus is nearly fully covered to avoid stray X-rays coming out of the apparatus, in a way as the person skilled in the art is used to. To the front, said coverage is achieved by first cover panel 83, second cover panel 84, and third cover panel 60 to which housing cover 70 is fixedly attached.

Notwithstanding the housing cover 70 housing its interior (which is the space into which the rejected items are moved to then fall down by gravity into bin 76) is mounted to the apparatus 100 laterally covering the sorting zone 50, access to sorting zone 50 can be obtained without dismounting the housing cover 70. This is because housing cover 70 can be pivoted from its working position in the working state shown in FIG. 1 to a pivoted release position shown in FIG. 2, giving said lateral access.

To this end, support frame 10 supports a longitudinal carrier beam 80 which extends in transport direction, in this embodiment along insert zone 30, inspection zone 40 and sorting zone 50. At level of the sorting zone 50, a hinge mechanism 67*a* is provided, hingedly linking the carrier beam 80 to a lower portion 67 of the third cover panel 60. Since the carrier beam 80 is in a height direction, arranged below the level of the lower side of the transport belt 20 (defining the return path thereof), said lower portion 67*a* extending to about the transport plane is a side cover covering a region below the sorting zone laterally from the sorting side.

Figure 3:
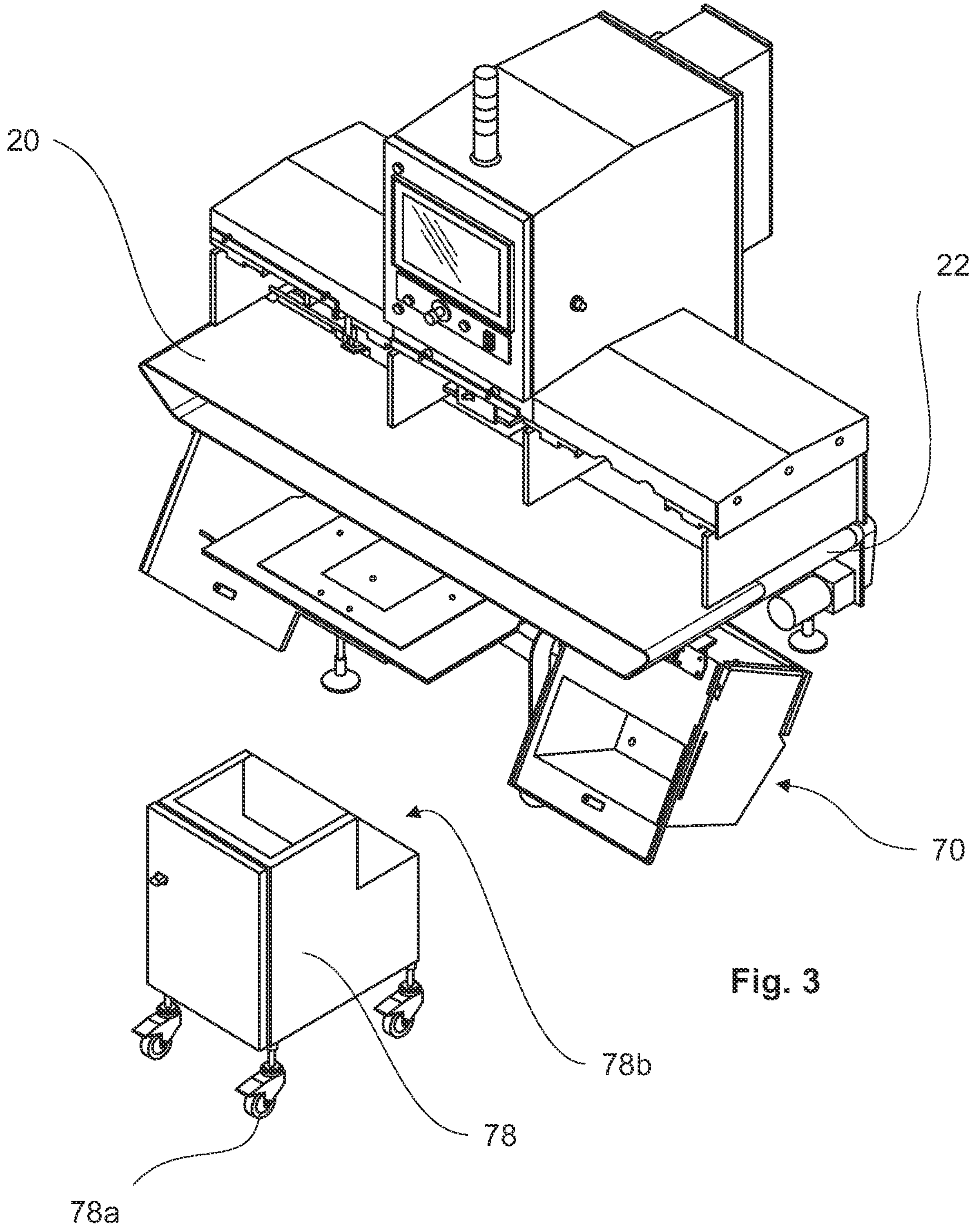
FIG. 3 is an oblique perspective view illustrating transport belt removal.
Figure 4:
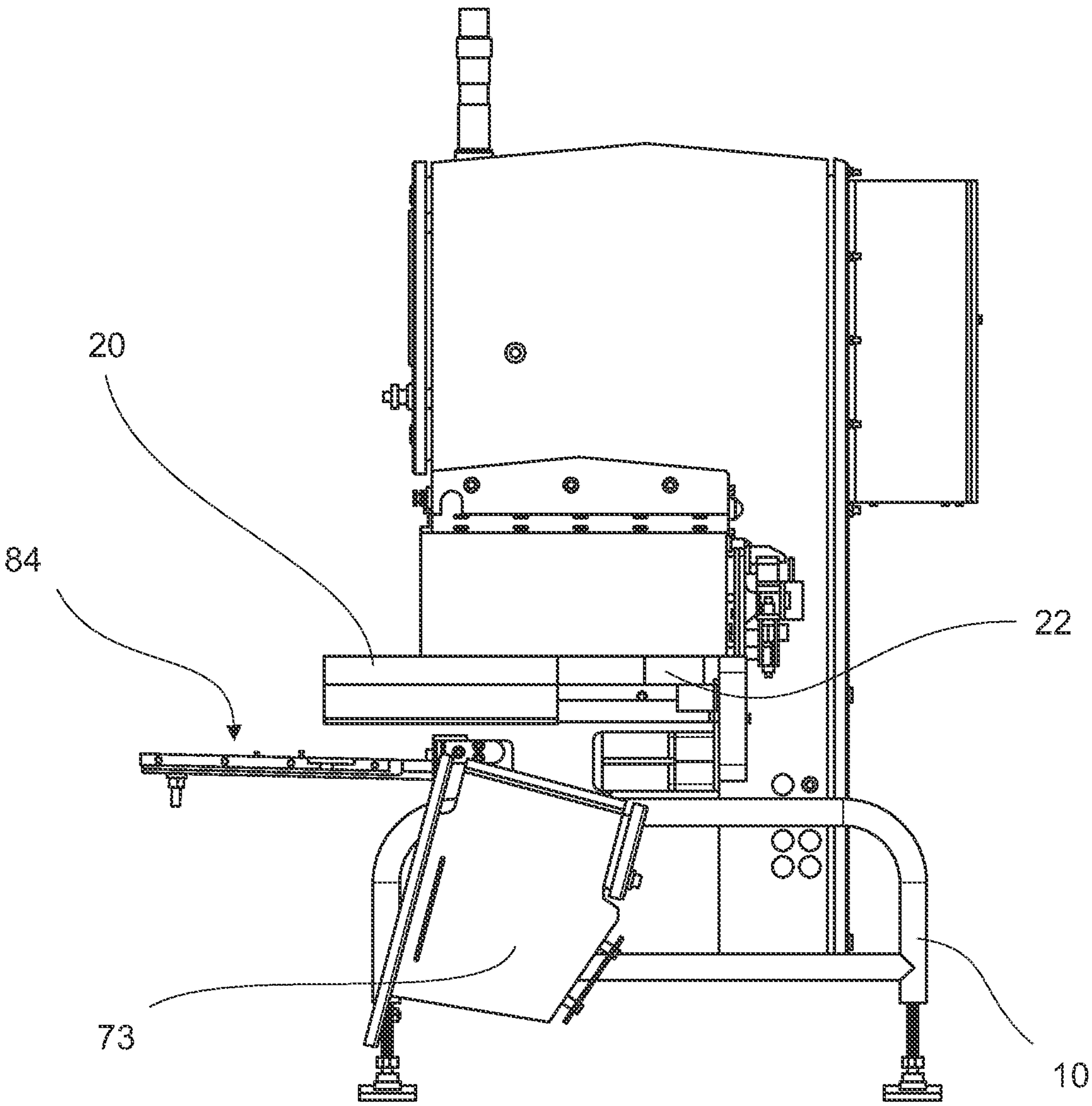
FIG. 4 illustrates the transport belt removal in a direction of view against a transport direction of the transport belt.

On said longitudinal carrier beam 80, further a hinge arrangement 84*a* is provided at level (in transport direction) of the inspection zone 40, hingedly linking the second cover panel 84, and further, at level of the inlet zone 30, a hinge mechanism 83*a* hingedly linking first cover panel 83. As one can see from FIG. 2, there is entire lateral access of inlet zone 30, inspection zone 40 and sorting zone 50, when cover panels 83 and 84 are opened and also the whole housing cover 70 is opened by pivoting about pivot axis X defined by hinge arrangement 67*a*. Moreover, due to the above described arrangement of hinge mechanism 67*a* with reference to the height level of the transport belt 20, there is sufficient access to strip the transport belt 20 off from its holding rollers (upper holding roller 21 at insert of transport path, upper holding roller 22 at the end of the transport path). That is, the cover housing 70 for coupling the reject bin 76 to the apparatus 100 in a covered manner is not even to be dismounted for belt removal/replacement. This is best to be seen from FIG. 3 and FIG. 4. The belt 20 can be taken off uniformly with essentially unchanged area of the interior of the endless belt 20 orthogonal to a width direction (which width direction being orthogonal to both transport direction and height direction).

Figure 5A:
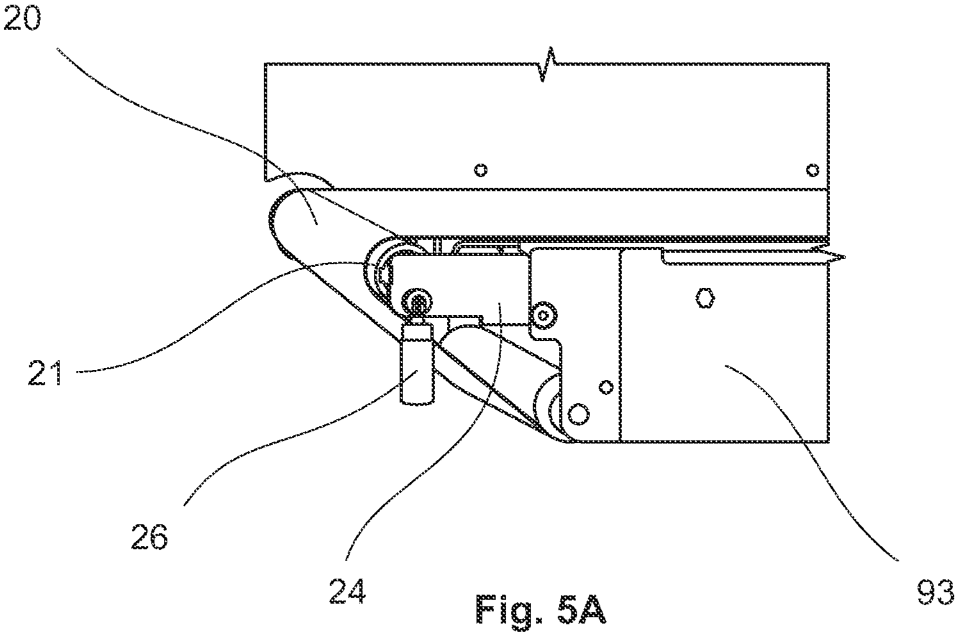
FIGS. 5A and 5B show two roller positions for belt tension relief.
Figure 5B:
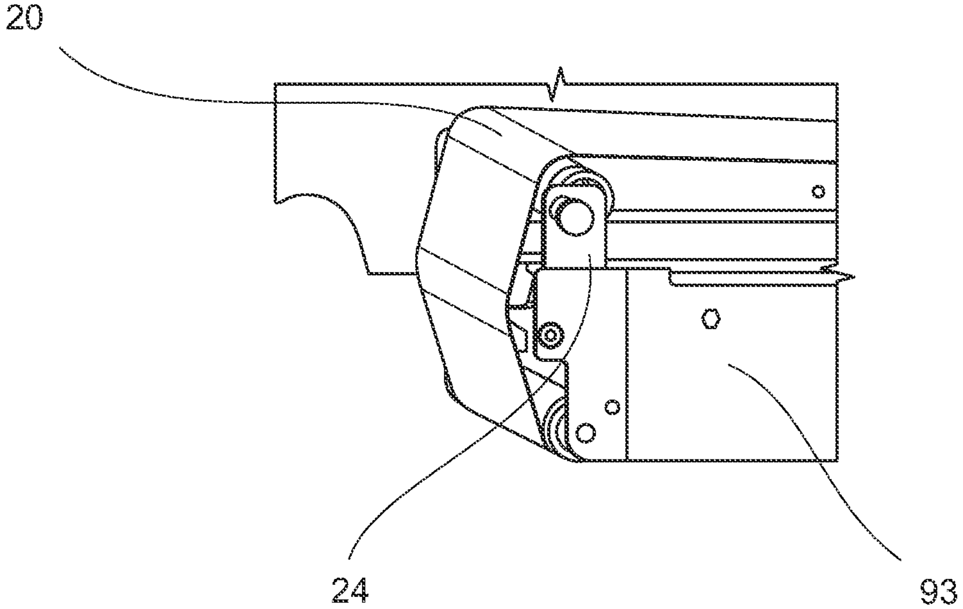

In order to take off the belt 20 with lower tension than in the working state, roller 21 is pivotable via pivotable holding arms 24 in, with reference to FIG. 2, counter clockwise direction. To this end, a release lever 26 is activated to allow motion from the working position of arms 24 shown in FIG. 5A to be rotated in the position shown in FIG. 5B to reduce the tension of the belt 20. Said lever 26 can be activated tool-free just by hand.

As one can see from the embodiment of FIGS. 1 and 2, the pivot motion to bring the housing cover 70 from its working state to a release state can be executed even without removing bin 76 from the housing cover 70. Then (FIG. 2), the release position of the housing cover 70 is roughly such that the plane of third cover panel 60 is essentially horizontal. In case that bin 76 is removed before pivoting housing cover 70, the pivot motion can continue significantly beyond 90°, such as to provide for more lateral space at the level of the sorting zone 50, if desired. As can be further seen in FIG. 3, coupling of the bin 76 for hanging arrangement can also be modified for a bin standing on the floor, as bin 78 shown in FIG. 3, having roller feet 78*a*. Bin 78 can be emptied, e.g., by opening its front door, and has a first portion being in its working position underneath the housing cover 70. Bin 78 further has a second portion 78*b* which, seen in direction of gravity, is arranged below the sorting zone 50 or a part thereof.

As one can further see, best in FIG. 2, the first cover panel 83 and the support frame 10 do not overlap in transport direction. Also there is no overlap between the support frame 10 and the housing cover 70 in transport direction, while the support frame laterally extends in width direction beyond the inspection zone 40.

The space between upper side (transport) and lower side (return path) of the transport belt 20 is protected by protection panel 90 even in the release position of cover panels 83, 84 and of housing cover 70. Respective sections 93, 94 and 95 of protection panel 90 corresponding to the zones 30, 40, 50 are continuous in this embodiment, but could be in form of several independent pieces.

REFERENCE NUMBER LIST

10 support frame
12 feet
15 inspection unit
18 operation panel
20 transport belt
21, 22 roller
24 arm
26 lever
30 inlet zone
31, 34, 45, 51 curtain
40 inspection zone
50 sorting zone
60, 63, 84 panel
67 side cover
67*a*, 83*a*, 84*a* hinge mechanism
70 housing cover
71 lower top side cover
72, 73 side cover
74 upper side cover
75 top side cover
76, 78 bin
78*a* roller
78*b* bin portion
80 carrier beam
90 inner cover
93, 94, 95 inner cover portions
100 inspection and sorting apparatus

What is claimed is:

1. An inspection and sorting apparatus, comprising:

a support frame supporting a transport mechanism with an endless transport belt extending along an inspection zone in which items transported on the transport belt along a transport path are inspected by an inspection mechanism and along a sorting zone in which items to be rejected are sorted out by being moved, by a sorting mechanism, out of the transport path in a direction transverse to the transport path to a sorting side;

wherein, in an operation state of the apparatus:

a space lateral to and alongside the sorting zone, into which the rejected items are moved, is covered by a housing cover but is open to the sorting zone and to a downside to allow the rejected items to further fall or slide down by gravity; and/or the apparatus is provided with a side cover covering a region below the sorting zone laterally from the sorting side;

wherein the housing cover and/or the side cover is movable between a covering position in the operation state of the apparatus and a release position granting lateral access to the sorting zone and/or to said region from the sorting side;

wherein the housing cover and the side cover are connected and their motion between covering and release position is linked.

2. The apparatus of claim 1, wherein the motion between the covering position and the release position is uniform along the direction of the transport path.

3. The apparatus of claim 1, wherein the motion between covering and release position is a pivot motion.

4. The apparatus of claim 3, wherein the pivot axis of the pivot motion is in a direction along the transport path.

5. The apparatus of claim 3, wherein a hinge mechanism position for said pivot motion of the housing cover, the side cover, and/or a further side cover is a vertical distance from the height level of the return path of the transport belt of more than 1 cm and/or less than 16 cm.

6. The apparatus of claim 5 wherein the vertical distance is more than 3 cm and less than 8 cm.

7. The apparatus of claim 1, wherein, in the release position of the side cover, a strap formed by the transport path of and return path below the sorting zone is accessible.

8. The apparatus of claim 1, wherein the inspection zone, a further region below the inspection zone, an inlet zone along which the transport belt is extended upstream of the transport path of the inspection zone and/or a yet further region below the inlet zone is laterally covered by a further side cover arrangement in the covering position in the operation state, and is movable, in particular pivotable, in particular about a pivot axis parallel to or colinear with the pivot axis of the housing cover and/or the side cover, as a whole or in two or more pieces.

9. The apparatus of claim 1, further comprising a bin positionable below said space in working position, for accommodating rejected items falling down/through said space.

10. The apparatus of claim 9, wherein the bin is releasably mounted to the side cover and/or housing cover and the motion of the housing is effectable in the mounting position of the bin.

11. The apparatus of claim 1, further comprising an inner cover laterally covering a space between transport path side and return path side of the transport belt and dimensioned to pass through the interior of the endless belt when the endless belt is relatively moved with respect to the inner cover transverse to the transport direction.

12. The apparatus of claim 11, further comprising a carrier beam, extending in particular in transport path direction, to which a hinge mechanism for the pivot motion of the housing cover, the side cover, and/or the further cover are mounted, wherein said carrier beam is arranged on a height level below the inner cover and below the return path of the transport belt.

13. The apparatus of claim 1, wherein a holding mechanism holding a roller at the beginning and/or a roller at the end of the transport path of the transport belt is switchable from a holding position for the operation state of the apparatus and a release position allowing the belt to be stripped off for lateral removal.

14. The apparatus of claim 1, further comprising an operating panel.

15. The apparatus of claim 14, wherein said operating panel is located at the sorting side.

16. The apparatus of claim 1, wherein the inspection mechanism consists of or comprises X-ray inspection of the items processed by the apparatus.

17. An inspection and sorting apparatus, said apparatus comprising:

a support frame supporting a transport mechanism comprising an endless transport belt extending along a transport path comprising an inspection zone and a sorting zone;

an inspection mechanism located at the inspection zone for inspecting items transported on the transport belt along the transport path;

a sorting mechanism located at the sorting zone for selectively moving items out of the transport path in a direction transverse to the transport path to a sorting side;

wherein, in an operation state of the apparatus:

a space lateral to and alongside the sorting zone is covered by a housing cover and open to the sorting zone and to a downside for allowing the rejected items to further fall or slide down by gravity; and/or a side cover is provided which covers a region below the sorting zone laterally from the sorting side;

wherein the housing cover and/or the side cover is movable between a covering position in the operation state of the apparatus and a release position granting lateral access to the sorting zone and/or to said region from the sorting side;

wherein the housing cover and the side cover are connected and their motion between the covering position and the release position is linked.

18. An inspection and sorting apparatus, comprising:

a support frame supporting a transport mechanism with an endless transport belt extending along an inspection zone in which items transported on the transport belt along a transport path are inspected by an inspection mechanism and along a sorting zone in which items to be rejected are sorted out by being moved, by a sorting mechanism, out of the transport path in a direction transverse to the transport path to a sorting side;

wherein, in an operation state of the apparatus:

a space lateral to and alongside the sorting zone, into which the rejected items are moved, is covered by a housing cover but is open to the sorting zone and to a downside to allow the rejected items to further fall or slide down by gravity; and/or the apparatus is provided with a side cover covering a region below the sorting zone laterally from the sorting side;

wherein the housing cover and/or the side cover is movable between a covering position in the operation state of the apparatus and a release position granting lateral access to the sorting zone and/or to said region from the sorting side; and a bin positionable below said space in working position, for accommodating rejected items falling down/through said space, wherein the bin is releasably mounted to the side cover and/or housing cover and the motion of the housing is effectable in the mounting position of the bin.

* * * * *